(12) United States Patent
Yang et al.

(10) Patent No.: US 10,320,287 B2
(45) Date of Patent: Jun. 11, 2019

(54) DC-DC CONVERTER DRIVING DEVICE AND METHOD FOR DRIVING DC-DC CONVERTER USING THE SAME

(71) Applicant: ELECTRONICS AND TELECOMMUNICATIONS RESEARCH INSTITUTE, Daejeon (KR)

(72) Inventors: Yil Suk Yang, Daejeon (KR); Jimin Oh, Daejeon (KR); Jong Pil Im, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/981,774

(22) Filed: May 16, 2018

(65) Prior Publication Data

US 2019/0068051 A1   Feb. 28, 2019

(30) Foreign Application Priority Data

Aug. 30, 2017   (KR) .................. 10-2017-0110417

(51) Int. Cl.
*H02M 1/00* (2006.01)
*H02M 3/04* (2006.01)

(52) U.S. Cl.
CPC ............... *H02M 3/04* (2013.01); *H02M 1/00* (2013.01); *H02M 2001/008* (2013.01);
(Continued)

(58) Field of Classification Search
CPC ... H02M 2001/0025; H02M 2001/009; H02M 3/04; H02M 1/00; H02M 2001/0009; H02M 2001/008
(Continued)

(56) References Cited

U.S. PATENT DOCUMENTS 8,975,879 B2   3/2015  Xu et al.
9,007,039 B2   4/2015  Kim et al.
(Continued)

FOREIGN PATENT DOCUMENTS

KR   10-1284976 B1   7/2013

OTHER PUBLICATIONS

US 8,441,148 B2, 05/2013, Moussaoui et al. (withdrawn)
(Continued)

*Primary Examiner* — Alex Torres-Rivera

(57) ABSTRACT

Provided are a DC-DC converter driving device and a driving method thereof, the DC-DC converter driving device including an error detector configured to compare a first feedback voltage corresponding to a first output terminal with a first compensation reference voltage to generate a first error voltage, and configured to compare a second feedback voltage corresponding to a second output terminal with a second compensation reference voltage to generate a second error voltage, an interference detector configured to determine interference between the first and second output terminals on the basis of the first and second error voltages to generate an interference error voltage, and a reference voltage compensator configured to assign a weight to the interference error voltage to generate the first and second compensation reference voltages, and thus priorities are determined for outputs of the DC-DC converter and weights according thereto are assigned to reduce occurrence of cross-regulation.

15 Claims, 9 Drawing Sheets

(52) U.S. Cl.
CPC ............... *H02M 2001/0009* (2013.01); *H02M 2001/009* (2013.01); *H02M 2001/0025* (2013.01)

(58) Field of Classification Search
USPC .................................................. 323/266, 267
See application file for complete search history.

(56) References Cited

U.S. PATENT DOCUMENTS

| | | | |
|---|---|---|---|
| 9,647,554 B1 | 5/2017 | Oh et al. | |
| 2008/0231115 A1* | 9/2008 | Cho ........................ | H02J 1/08 307/41 |
| 2010/0026267 A1* | 2/2010 | Easwaran ............. | H02M 3/158 323/288 |
| 2011/0043181 A1* | 2/2011 | Jing ....................... | H02M 3/158 323/288 |
| 2011/0169468 A1* | 7/2011 | Wu ........................ | H02M 3/157 323/282 |
| 2012/0169307 A1* | 7/2012 | Chen ..................... | H02M 3/158 323/271 |
| 2012/0286576 A1* | 11/2012 | Jing ....................... | H02M 3/156 307/43 |
| 2013/0229058 A1* | 9/2013 | Chen ........................ | H02J 1/00 307/31 |
| 2015/0008742 A1 | 1/2015 | Huang et al. | |
| 2015/0270779 A1 | 9/2015 | Im et al. | |
| 2017/0023959 A1* | 1/2017 | Chen ........................ | G05F 1/56 |
| 2017/0054367 A1* | 2/2017 | Dhanasekaran ...... | H02M 3/158 |

OTHER PUBLICATIONS

Wei-Chung Chen et al., "Single-Inductor Quad-Output Switching Converter With Priority-Scheduled Program for Fast Transient Response and Unlimited Load Range in 40 nm CMOS Technology", IEEE Journal of Solid-State Circuits, Jul. 2015, pp. 1525-1539, vol. 50, No. 7, IEEE.

Chih-Wei Chen et al., "A Low-Power Dual-Frequency SIMO Buck Converter Topology With Fully-Integrated Outputs and Fast Dynamic Operation in 45 nm CMOS", IEEE Journal of Solid-State Circuits, Sep. 2015, pp. 2161-2173, vol. 50, No. 9, IEEE.

Min-Yong Jung et al., "An Error-Based Controlled Single-Inductor 10-Output DC-DC Buck Converter With High Efficiency Under Light Load Using Adaptive Pulse Modulation", IEEE Journal of Solid-State Circuits, Dec. 2015, pp. 2825-2838, vol. 50, No. 12, IEEE.

* cited by examiner

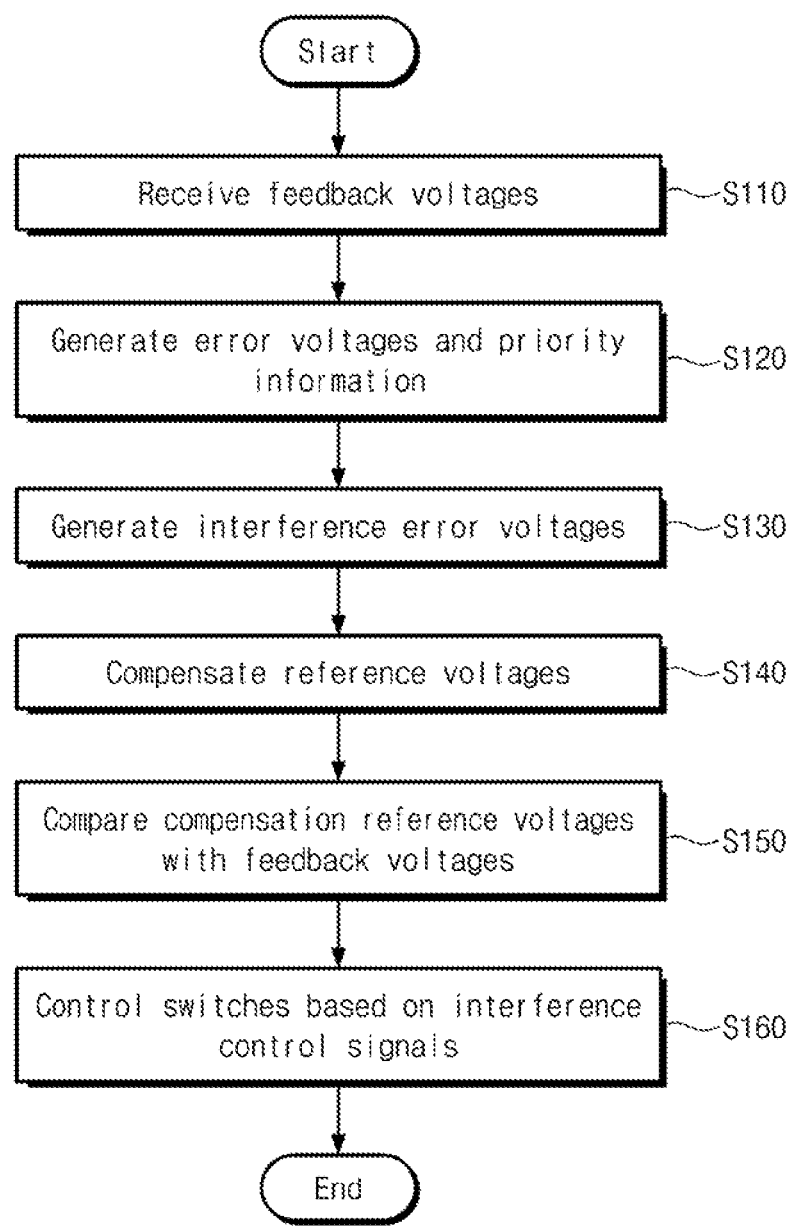

DC-DC CONVERTER DRIVING DEVICE AND METHOD FOR DRIVING DC-DC CONVERTER USING THE SAME

CROSS-REFERENCE TO RELATED APPLICATIONS

This U.S. non-provisional patent application claims priority under 35 U.S.C. § 119 of Korean Patent Application No. 10-2017-0110417, filed on Aug. 30, 2017, the entire contents of which are hereby incorporated by reference.

BACKGROUND

The present disclosure herein relates to a Direct Current-to-Direct Current (DC-DC) converter having multi-output terminals, and more particularly, to a DC-DC converter driving device and a method for driving a DC-DC converter using the same.

A DC-DC converter steps up or steps down a direct current input voltage to generate a DC output voltage necessary for a load. The load may include various electronic devices such as a computer or a mobile device. Such electronic devices may include elements for performing various functions. The various elements included in the electronic devices may have different operation voltages. Accordingly, there is a demand for a multi-output DC-DC converter capable of generating various output voltages in one DC-DC converter.

A multi-output DC-DC converter may include a plurality of voltage output terminals in order to generate various output voltages. The plurality of voltage output terminals may output DC output voltages of different voltage levels. The plurality of voltage output terminals are required to output accurate voltage levels required by a load despite of any external factors. For example, an abrupt change in load connected to the plurality of voltage output terminals may be one factor disturbing output of an accurate voltage.

A Single-Inductor Multi-Output (SIMO) DC-DC converter is advantageous in that it is implementable with a lower cost and a smaller area than a Multi-Inductor Multi-Output (MIMO) converter. However, the SIMO DC-DC converter shares a single inductor, and thus interference may occur between output terminals according to a charged or discharged state of the inductor. Accordingly, it is necessary to secure stability and accuracy of output voltages of the SIMO DC-DC converter.

SUMMARY

The present disclosure provides a Direct Current-to-Direct Current (DC-DC) converter driving device for reducing occurrence of interference such as cross-regulation at a plurality of output terminals, and a method for driving a DC-DC converter using the same.

An embodiment of the inventive concept provides a Direct Current-Direct Current (DC-DC) converter driving device capable of driving a single-inductor multi-output DC-DC converter. The DC-DC converter driving device includes an error detector, an interference detector a reference voltage compensator and a switch controller.

In an embodiment, the error detector may compare a first feedback voltage corresponding to a first output terminal with a first compensation reference voltage to generate a first error voltage. The error detector may compare a second feedback voltage corresponding to a second output terminal with a second compensation reference voltage to generate a second error voltage. The error detector may compare an absolute value of the first error voltage with an absolute value of the second error voltage to generate priority information for indicating an error voltage having a largest absolute value.

In an embodiment, the interference detector may determine interference between the first output terminal and the second output terminal on a basis of levels of the first and second error voltages, and generate an interference error voltage. The interference detector may output a first interference error voltage having a same level as the error voltage having the absolute value of the highest priority to the reference voltage compensator. The interference detector may output a second interference error voltage that is a difference between the error voltage having the absolute value of the highest priority and an error voltage having an absolute voltage of a next priority to the reference voltage compensator. The interference detector may generate, in response to interference between the first output terminal and the second output terminal, a first interference control signal and a second interference control signal. The switch controller may adjust the first output voltage on a basis of the first interference control signal, and adjust the second output voltage on a basis of the second interference control signal.

In an embodiment, the reference voltage compensator may assign a weight to the interference error voltage to generate the first and second compensation reference voltages. The reference voltage compensator may include a weight voltage generator, and first and second buffers. The weight voltage generator may generate a first weight voltage and a second weight voltage. The first buffer may compensate a first reference voltage with the first compensation reference voltage on a basis of the first weight voltage. The second buffer may compensate a second reference voltage with the second compensation reference voltage on a basis of the second weight voltage.

In an embodiment, the weight voltage generator may include first to fourth weight calculators, and first and second adders. The first weight calculator may multiply the first interference error voltage by a first weight variable to output a first weighted interference error voltage. The second weight calculator may multiply the second interference error voltage by a second weight variable to output a second weighted interference error voltage. The first adder may add the first weighted interference error voltage to the second weighted interference error voltage to output the first weight voltage. The third weight calculator may multiply the first interference error voltage by the third weight variable to output a third weighted interference error voltage. The fourth weight calculator may multiply the second interference error voltage by a fourth weight variable to output a fourth weighted interference error voltage. The second adder may add the third weighted interference error voltage to the fourth weighted interference error voltage to output the second weight voltage.

In an embodiment of the inventive concept, a method for driving a DC-DC converter including: receiving feedback voltages respectively corresponding to a plurality of output terminals; respectively comparing reference voltages respectively corresponding to the plurality of output terminals with feedback voltages to generate error voltages; generating interference error voltages on a basis of an error voltage having a largest absolute value from among the error voltages; and respectively assigning weights to the interference error voltages to compensate the reference voltages with compensation reference voltages.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 8 is a flowchart of a method for driving a DC-DC converter according to an embodiment of the inventive concept.

DETAILED DESCRIPTION

Hereinafter, an exemplary embodiment of the present disclosure will be described in detail with reference to the accompanying drawings such that a person skilled in the art may easily carry out the embodiments of the present disclosure.

Figure 1:
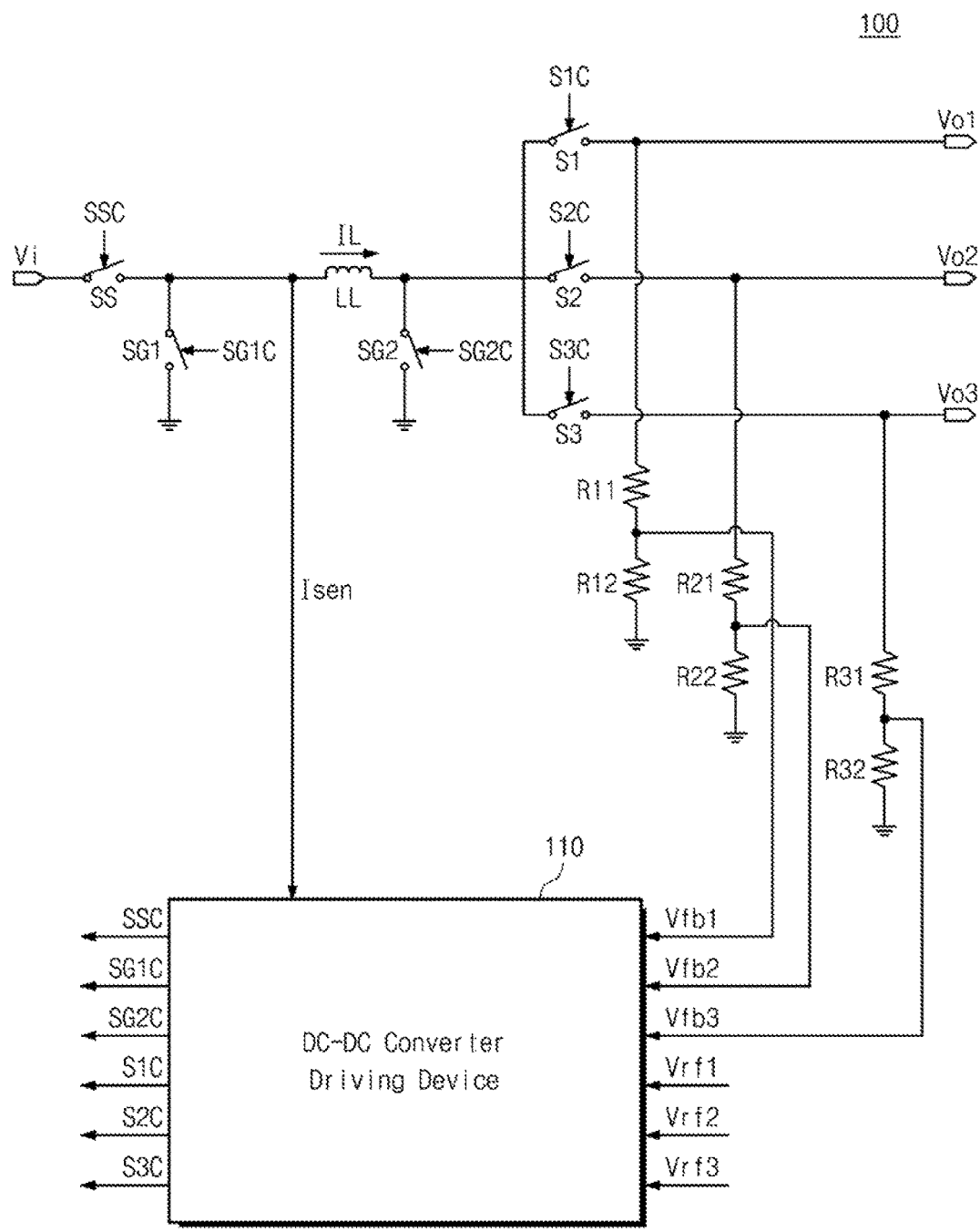
FIG. 1 is a circuit diagram of a Direct Current-to-Direct Current (DC-DC) converter according to an embodiment of the inventive concept.

FIG. 1 is a circuit diagram of a DC-DC converter according to an embodiment of the inventive concept. In relation to FIG. 1, a DC-DC converter 100 includes an inductor LL, an input switch SS, a first ground switch SG1, a second ground switch SG2, first to third output switches S1 to S3, and a DC-DC converter driving device 110. The DC-DC converter 100 may include an input terminal for receiving an input voltage Vi from a power supply unit (not shown).

The DC-DC converter 100 steps up or steps down a DC input voltage and generates first to third output voltages Vo1 to Vo3 having various voltage levels to provide the generated voltages to a load (not shown). The DC-DC converter 100 may include first to third output terminals in order to provide the first to third output voltages Vo1 to Vo3 to the load. The DC-DC converter 100 of FIG. 1 provides the first to third output voltages Vo1 to Vo3 to the respective three output terminals. However, the inventive concept is not limited thereto and the DC-DC converter 100 may provided the output voltages to the multi-output terminals. The number of the output terminals of the DC-DC converter 100 is not limited. For convenience of description, hereinafter, it is assumed that three output terminals are provided.

The inductor LL may be electrically connected to the input terminal. A voltage difference is generated at both terminals of the inductor LL on the basis of an input voltage generated by the power supply unit (not shown), and then an inductor current IL flows. As the inductor current IL increases, the inductor may store energy. The stored energy may be delivered to the load on the basis of an on-off operation of the first ground switch SG1, the second ground switch SG2, and the first to third output switches S1 to S3. In order to output the energy, the inductor LL may be electrically connected to the first to third output switches S1 to S3.

The input switch SS may be provided between the inductor LL and the input terminal. The input switch SS may be switched on or off in response to an input switch control signal SSC. When the input switch SS is switched on, the inductor LL is electrically connected to the input terminal and the input voltage Vi may be provided to the inductor LL. When the input switch SS is switched off, the inductor LL is electrically separated from the input terminal and the input voltage Vi is not provided to the inductor LL.

The first and second ground switches SG1 and SG2 are connected between the ground and the inductor LL. The first ground switch SG1 may be switched on or off in response to a first ground switch control signal SG1C. The second ground switch SG2 may be switched on or off in response to a second ground switch control signal SG2C. When the first ground switch is switched on, the input voltage Vi is not applied to the inductor LL. When the second ground switch SG2 is switched on, the inductor current IL is not delivered to the first to third output switched S1 to S3.

During charging time, the input switch SS and the second ground switch SG2 are switched on, and the first ground switch SG1 is switched off. In this case, the energy is stored until the maximum current flows through the inductor LL. During discharging time, the second ground switch SG2 is switched off. In this case, the energy stored in the inductor LL is provided to the first to third output terminals. The first to third output voltages Vo1 to Vo3 may be provided on the basis of the inductor current IL flowing through the inductor LL.

The first to third output switches S1 to S3 may be electrically connected to the inductor LL. The first to third output switches S1 to S3 may receive the inductor current IL from the inductor LL. The first to third output switches S1 to S3 may selectively deliver energy to the first to third output terminals on the basis of the first to third output switch control signals S1C to S3C. In other words, the inductor current IL may be distributed according to the switching-on of the first to third output switches S1 to S3.

The DC-DC converter driving device 110 may control on-off operations of the switches included in the DC-DC converter 100 to control a voltage step-up or step-down of the DC-DC converter 100. The DC-DC converter driving device 110 may generate the input switch control signal SSC, the first and second ground switch control signals SG1C and SG2C, and the first to third output switch control signals S1C to S3C. To this end, the DC-DC converter driving device 110 may receive first to third feedback voltages Vfb1 to Vfb3.

The first feedback voltage Vfb1 may be generated by dividing the first output voltage Vo1. In order to generate the first feedback voltage Vfb1, the DC-DC converter 100 may include two first division resistors R11 and R12 connected to the first output terminal and connected to each other in series. The second feedback voltage Vfb2 may be generated by dividing the second output voltage Vo2. In order to generate the second feedback voltage Vfb2, the DC-DC converter 100 may include second division resistors R21 and R22 connected to the second output terminal and connected to each other in series. The third feedback voltage Vfb3 may be generated by dividing the third output voltage Vo3. In order to generate the third feedback voltage Vfb3, the DC-DC converter 100 may include third division resistors R31 and R32 connected to the third output terminal and connected to each other in series.

The DC-DC converter driving device 110 may receive first to third reference voltages Vrf1 to Vrf3. Typically, the DC-DC converter driving device 110 compares the first reference voltage Vrf1 with the first feedback voltage Vfb1, compares the second reference voltage Vrf2 with the second feedback voltage Vfb2, and compares the third reference voltage Vrf3 with the third feedback voltage Vfb3. The DC-DC converter driving device 110 may control the first to third output voltages Vo1 to Vo3 on the basis of differences between the first to third feedback voltages Vfb1 to Vfb3 and the first to third reference voltages Vrf1 to Vrf3.

As shown in FIG. 1, for the multi-output DC-DC converter 100, interference such as cross-regulation may occur due to an abrupt change in load connected to the output terminal. In particular, when an output voltage is applied to output terminals through a single inductor LL, charging and discharging energy is performed in the single inductor LL and thus the interference may become an issue. For example, the load connected to the first output terminal may abruptly increase or decrease. In this case, an overshoot or undershoot may occur in the first output voltage Vo1. In addition, an overshoot or undershoot may also occur in the second output voltage Vo2 and the third output voltage Vo3 due to a change in the load connected to the first output terminal.

Figure 2:
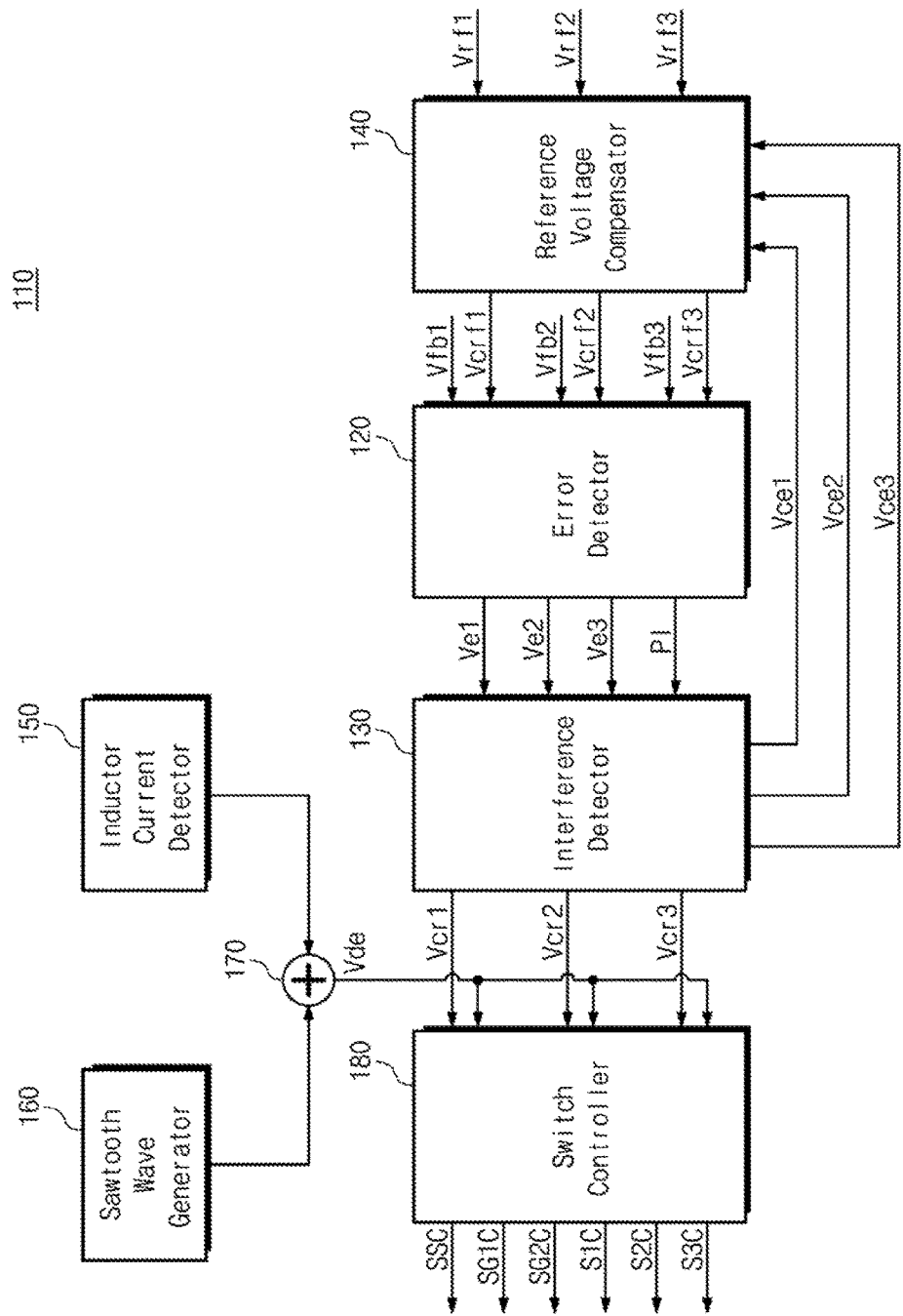
FIG. 2 is an exemplary block diagram of the DC-DC converter driving device of FIG. 1.

FIG. 2 is an exemplary block diagram of the DC-DC converter driving device of FIG. 1. In relation to FIG. 2, the DC-DC converter driving device 110 may include an error detector 120, an interference detector 130, a reference voltage compensator 140, an inductor current detector 150, a sawtooth wave generator 160, a signal synthesizer 170, and a switch controller 180. The DC-DC converter driving device 110 may be understood as an embodiment for implementing the DC-DC converter driving device 100 of FIG. 1. In other words, a part of components may be changed or replaced within a range in which the core feature of the inventive concept may be implemented.

The error detector 120 receives the first to third feedback voltages Vfb1 to Vfb3. The error detector 120 receives the first to third compensation reference voltages Vrf1 to Vrf3 from the reference voltage compensator 140. The first to third compensation reference voltages Vcrf1 to Vcrf3 may be results obtained by compensating the first to third reference voltages Vrf1 to Vrf3, when an overshoot or undershoot due to cross-regulation is detected. The error detector 120 may respectively compare the first to third feedback voltages Vfb1 to Vfb3 with the first to third compensation reference voltages Vcrf1 to Vcrf3.

The error detector 120 generates first to third error voltages Ve1 to Ve3. The error detector 120 may amplify a difference between the first compensation reference voltage Vcrf1 and the first feedback voltage Vfb1 to generate the first error voltage Ve1. The error detector 120 may amplify a difference between the second compensation reference voltage Vcrf2 and the second feedback voltage Vfb2 to generate the second error voltage Ve2. The error detector 120 may amplify a difference between the third compensation reference voltage Vcrf3 and the third feedback voltage Vfb3 to generate the third error voltage Ve3. In other words, the error detector 120 may detect the voltage error in each of the first to third output terminals.

The error detector 120 further generates priority information PI. The priority information PI may be generated to determine an output voltage that is most abruptly changed from among the first to third output voltages Vo1 to Vo3. The largest output voltage change may occur at an output terminal connected to the abruptly changed load. Accordingly, the priority information PI may be generated to detect the output terminal at which the largest output voltage change occurs. The error detector 120 may compare absolute values of the first to third error voltages Ve1 to Ve3 with each other. The error detector 120 may generate the priority information PI such that an error voltage having the largest absolute value has the highest priority from among the first to third error voltages Ve1 to Ve3.

The interference detector 130 receives the first to third error voltages Ve1 to Ve3 and the priority information PI from the error detector 120. The interference detector 130 may determine occurrence of interference in the DC-DC converter 100 on the basis of the first to third error voltages Ve1 to Ve3 and the priority information PI. For example, the interference detector 130 may detect an error voltage having the highest priority on the basis of the priority information PI. The interference detector 130 may determine an output terminal corresponding to the error voltage of the highest priority. The interference detector 130 may determine that the load connected to the corresponding output terminal is changed abruptly. In addition, the interference detector 130 may determine that each error voltage of the remaining output terminals occurs due to the interference.

The interference detector 130 generates first to third interference error voltages Vce1 to Vce3. The first interference error voltage Vce1 has the same level as the error voltage of the highest priority. For example, when an absolute value of the first error voltage Ve1 is larger than the second and third error voltages Vce2 and Vce3, the level of the first error voltage Ve1 is the same as the level of the first interference error voltage Vce1. The second interference error voltage Vce2 and the third interference error voltage Vce3 may be a difference value between remaining error voltage levels on the basis of the level of an error voltage of the highest priority. For example, when the absolute value of the first error voltage Ve1 is the largest, the second interference error voltage Vce2 may be a level difference value between the first error voltage Ve1 and the second error voltage Ve2. The third interference error voltage Vce3 may be a level difference value of the first error voltage Ve1 and the third error voltage Ve3.

The interference detector 130 generates first to third interference control signals Vcr1 to Vcr3. The first to third interference control signals Vcr1 to Vcr3 are generated on the basis of the first to third error voltages Ve1 to Ve3. In addition, results obtained by compensating the first to third reference voltages Vrf1 to Vrf3 with the first to third interference error voltages Vce1 to Vce3 are reflected to the first to third interference control signals Vcr1 to Vcr3. The first to third interference control signals Vcr1 to Vcr3 may be voltage signals.

The reference voltage compensator 140 receives the first to third interference error voltages Vce1 to Vce3 from the interference detector 130. The reference voltage compensator 140 assigns weights to the first to third interference error voltages Vce1 to Vce3 to compensate the first to third reference voltages Vrf1 to Vrf3. The reference voltage compensator 140 generates first to third weight voltages in order to compensate the first to third reference voltages Vrf1 to Vrf3. The level of the first weight voltage may be a sum of the first to third error voltages to which weight variables are reflected. The level of the second weight voltage may be a sum of the first to third error voltages to which the first weight voltage and other weight variables are reflected. The level of the third weight voltage may be a sum of the first to third error voltages to which the first and second weight voltages and other weight variables.

The reference voltage compensator 140 generates first to third compensation reference voltages Vcrf1 to Vcrf3. The reference voltage compensator 140 may compare the first to third weight voltages with the first to third reference voltages Vrf1 to Vrf3 to generate the first to third compensation reference voltages Vcrf1 to Vcrf3. For example, the level of the first compensation reference voltage Vcrf1 may be a difference between the first reference voltage Vrf1 and the first weight voltage. The level of the second compensation reference voltage Vcrf2 may be a difference between the second reference voltage Vrf2 and the second weight voltage. The level of the third compensation reference voltage Vcrf3 may be a difference between the third reference voltage Vrf3 and the third weight voltage. When a corresponding output voltage is overshoot, a corresponding compensation reference voltage level may be lowered than the reference voltage level. When a corresponding output voltage is undershoot, a corresponding compensation reference voltage level may be raised than the reference voltage level. A detailed process in which the first to third compensation reference voltages Vcrf1 to Vcrf3 are generated using the weights will be described later.

The inductor current detector 150 senses the inductor current IL of FIG. 1. For example, the inductor current detector 150 may receive a sensing current Isen from the inductor LL of FIG. 1. When the DC-DC converter driving device 110 operates in a current mode in which output currents to be provided to the first to third output terminals are controlled, the inductor current detector 150 may receive the sensing current Isen. When the DC-DC converter driving device 110 operates in a voltage mode in which the first to third output voltages Vo1 to Vo3 are controlled, the inductor current detector 150 may not receive the sensing current Isen. For comparison with the first to third interference control signals Vcr1 to Vcr3, the inductor current detector 150 may convert the sensing current Isen into a voltage signal.

The sawtooth wave generator 160 may generate a sawtooth wave signal for determining a duty ratio. When the DC-DC converter driving device 110 operates in the voltage mode or the current mode, the sawtooth wave generator 160 may generate a sawtooth wave signal. The sawtooth wave signal may be a voltage signal. The sawtooth wave signal and a signal output from the inductor current detector 150 may be added in the signal synthesizer 170. In the current mode, the signal synthesizer 170 may add the sawtooth signal and the signal output from the inductor current detector 150 to output a synthesis control signal Vde. In the voltage mode, the signal synthesizer 170 may output the sawtooth signal as the synthesis control signal Vde.

The switch controller 180 receives the first to third interference control signals Vcr1 to Vcr3 from the interference detector 130. The switch controller 180 receives the synthesis control signal Vde from the signal synthesizer 170. The switch controller 180 may compare the synthesis control signal Vde with the first to third interference control signals Vcr1 to Vcr3. The switch controller 180 may control the switches of FIG. 1 according to comparison results of the synthesis control signal Vde with the first to third interference control signals Vcr1 to Vcr3. For example, when the first interference signal has a larger value than the synthesis control signal Vde, the switch controller 180 may control the switch so as to block energy from being supplied to the first output terminal.

The switch controller 180 generates the input switch control signal SSC, the first and second switch control signals SG1C and SG2C, the first to third output switch control signals S1C to S3C. The switch controller 180 may include a switch control circuit for generating such switch control signals. The switch control circuit may include a first comparator for comparing the first interference control signal Vcr1 with the synthesis control signal Vde, a second comparator for comparing the second interference control signal Vcr2 with the synthesis control signal Vde, and a third comparator for comparing the third interference control signal Vcr3 with the synthesis control signal Vde. In addition, the switch controller 180 may further include a mode control circuit for controlling the current mode and voltage mode, and a timing control circuit for controlling an operation timing of the DC-DC converter driving device 100.

Figure 3:
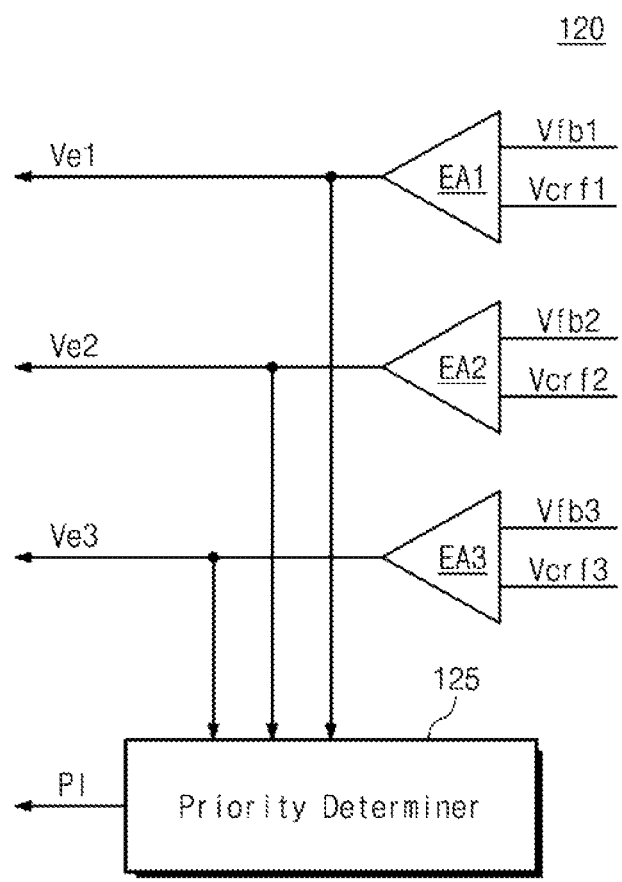
FIG. 3 is an exemplary drawing of the error detector of FIG. 2.

FIG. 3 is an exemplary circuit diagram of the error detector of FIG. 2. In relation to FIG. 3, the error detector 120 includes first to third error amplifiers EA1 to EA3, and a priority determiner 125. The error detector 120 of FIG. 3 may be understood as an embodiment for implementing a function of detecting an error of an individual output terminal and determining a priority.

The first error amplifier EA1 receives the first feedback voltage Vfb1 and the first compensation reference voltage Vcrf1. The first error amplifier EA1 may differentially amplify the input first feedback voltage Vfb1 and the first compensation reference voltage Vcrf1 to output the first error voltage Ve1. The second error amplifier EA2 receives the second feedback voltage Vfb2 and the second compensation reference voltage Vcrf2. The second error amplifier EA2 may differentially amplify the input second feedback voltage Vfb2 and the second compensation reference voltage Vcrf2 to output the second error voltage Ve2. The third error amplifier EA3 receives the third feedback voltage Vfb3 and the third compensation reference voltage Vcrf3. The third error amplifier EA3 may differentially amplify the input third feedback voltage Vfb3 and the third compensation reference voltage Vcrf3 to output the third error voltage Ve3.

When an overshoot or undershoot occurs due to interference, the first to third compensation reference voltages Vcrf1 to Vcrf3 may have larger differences from the corresponding first to third feedback voltages Vfb1 to Vfb3. In addition, when the DC-DC converter 100 normally operates without inference, the first to third compensation reference voltages Vcrf1 to Vcrf3 may have the same levels as the first to third feedback voltages Vfb1 to Vfb3. In this case, since it is not necessary to compensate the reference voltage due to interference, the first to third compensation reference voltages Vcrf1 to Vcfr3 may have the same levels as the first to third reference voltages Vrf1 to Vrf3. In addition, in a normal operation state without an error, the levels of the first to third error voltages Ve1 to ve3 may be 0.

The priority determiner 125 may receive the first to third error voltages Ve1 to Ve3 respectively from the first to third error amplifiers EA1 to EA3. The priority determiner 125 may extract each absolute value from the first to third error voltages Ve1 to Ve3. The priority determiner 125 may set, as the highest priority, an error voltage having the largest absolute value from among the first to third error voltages Ve1 to ve3. The priority determiner 125 may output the priority information PI that represents the error voltage set as the highest priority to the interference detector 130 of FIG. 2.

Figure 4:
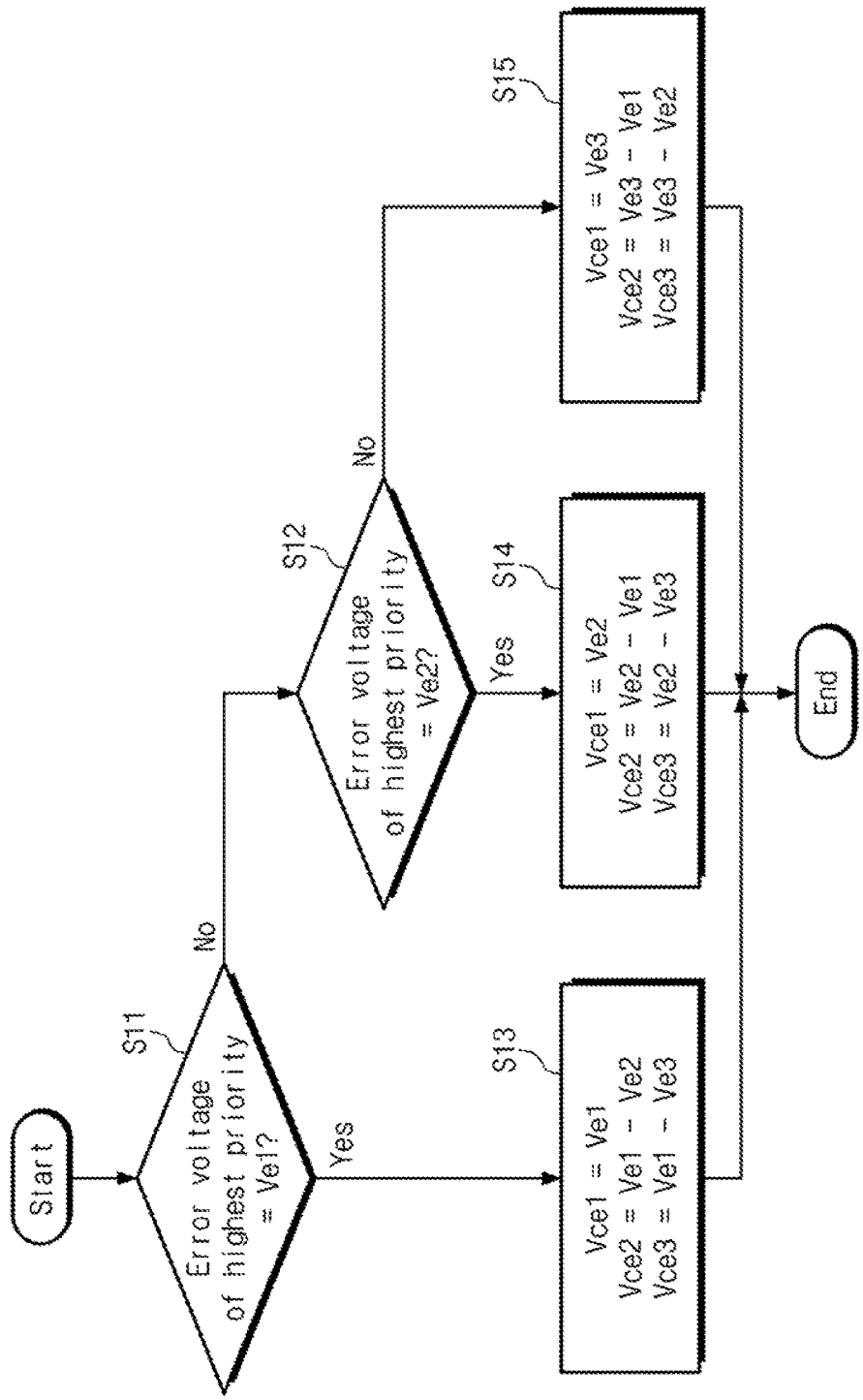
FIG. 4 is a flowchart for explaining a process for generating interference error voltages of FIG. 2.

FIG. 4 is a flowchart for describing a process for generating the first to third interference error voltages. The process for generating the first to third interference error voltages Vce1 to Vce3 may be performed in the interference detector 130 of FIG. 2. FIG. 4 illustrates, for convenience of description, a process for generating the interference error voltages from three error voltages, but the inventive concept is not limited thereto, and the interference error voltages may be generated from error voltages as many as the number of output terminals. Hereinafter, operations of FIG. 4 will be described using reference numerals of FIG. 2.

In operation S11, the interference detector 130 determines whether the first error voltage Ve1 is an error voltage of the highest priority. In other words, the interference detector 130 determines whether the first error voltage Ve1 has the largest absolute value from among the error voltages. When the first error voltage Ve1 has the highest priority, operation S13 proceeds. When the first error voltage Ve1 does not have the highest priority, operation S12 proceeds.

In operation S12, the interference detector 130 determines whether the second error voltage Ve2 is an error voltage of the highest priority. In other words, the interference detector 130 determines whether the second error voltage Ve2 has the largest absolute value from among the error voltages. When the second error voltage Ve2 has the highest priority, operation S14 proceeds. When the second error voltage Ve2 does not have the highest priority, operation S15 proceeds. In other words, when the third error voltage Ve3 has the highest priority, operation S15 proceeds.

For convenience of description, although operation S11 and operation S12 are separated to determine whether an error voltage has the highest priority, the error voltage set as the highest priority may be detected in one operation on the basis of the priority information PI. For example, the interference detector 130 may instantly identify an error voltage set as the highest priority from the PI received from the error detector 120. And then, in subsequent operations, the first to third interference error voltages are generated on the basis of the error voltage set as the highest priority. In other words, the first to third interference error voltages are generated on the basis of an output terminal that influences interference.

In operation S13, the interference detector 130 generates first to third interference error voltages Vce1 to Vce3 on the basis of the first error voltage Ve1. The interference detector 130 generates the first interference error voltage Vce1 having the same value as the first error voltage Ve1. The interference detector 130 generates the second interference error voltage Vce2 having a difference value between the first error voltage Ve1 and the second error voltage Ve2. The interference detector 130 generates the third interference error voltage Vce3 having a difference value between the first error voltage Ve1 and the third error voltage Ve3.

In operation S14, the interference detector 130 generates the first to third interference error voltages Vce1 to Vce3 on the basis of the second error voltage Ve2. The interference detector 130 generates the first interference error voltage Vce1 having the same value as the second error voltage Ve2. The interference detector 130 generates the second interference error voltage Vce2 having a difference value between the second error voltage Ve2 and the first error voltage Ve1. The interference detector 130 generates the third interference error voltage Vce3 having a difference value between the second error voltage Ve2 and the third error voltage Ve3.

In operation S15, the interference detector 130 generates first to third interference error voltages Vce1 to Vce3 on the basis of the third error voltage Ve3. The interference detector 130 generates the first interference error voltage Vce1 having the same value as the third error voltage Ve3. The interference detector 130 generates the second interference error voltage Vce2 having a difference value between the third error voltage Ve3 and the first error voltage Ve1. The interference detector 130 generates the third interference error voltage Vce3 having a difference value between the third error voltage Ve3 and the second error voltage Ve2.

Figure 5:
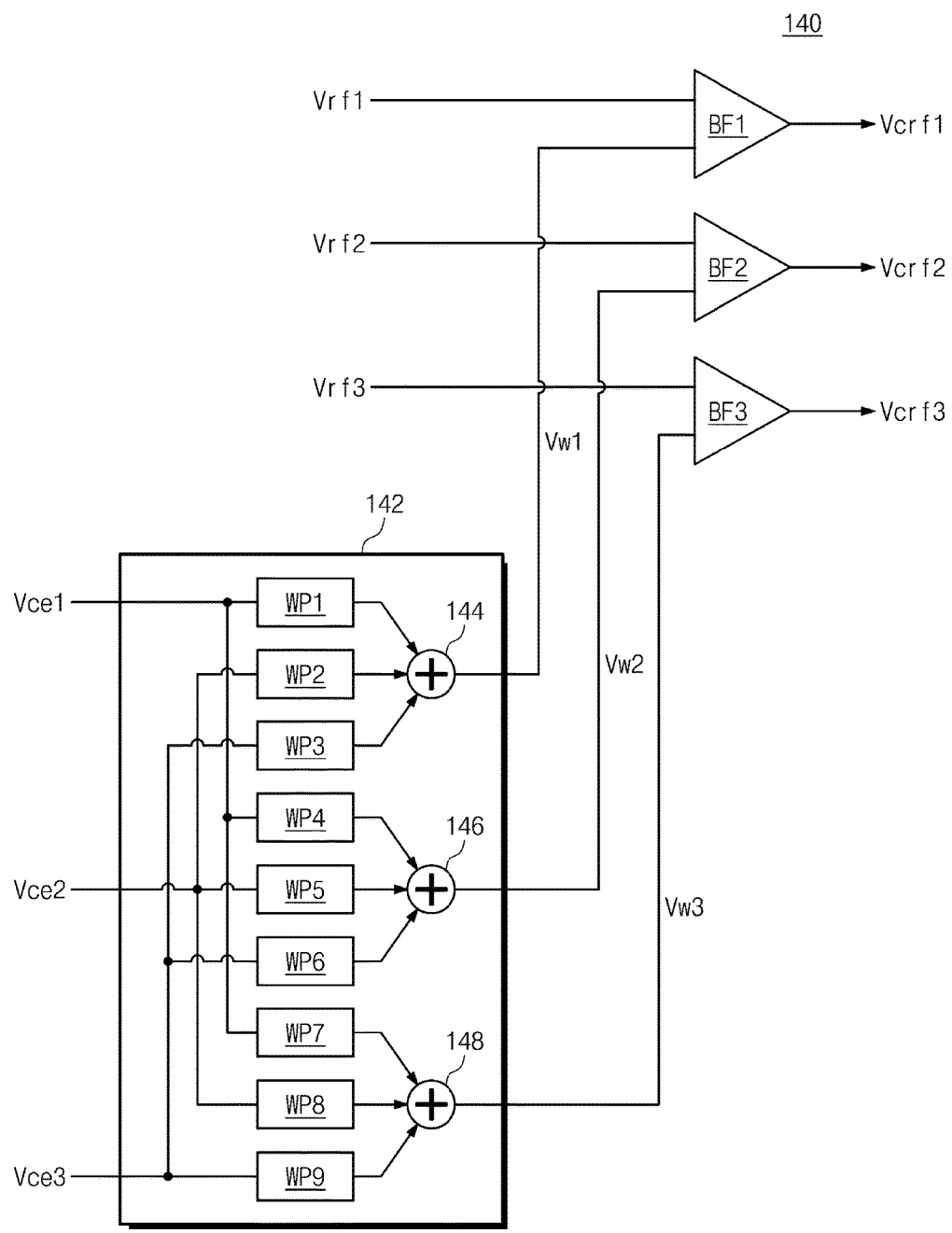
FIG. 5 is an exemplary drawing of the reference voltage compensator of FIG. 2.

FIG. 5 is an exemplary drawing of the reference voltage compensator of FIG. 2. In relation to FIG. 5, the reference voltage compensator 140 includes a weight voltage generator 142 and first to third buffers BF1 to BF3. The weight voltage generator 142 includes first to ninth weight calculators WP1 to WP9, and first to third adders 144, 146, and 148. The reference voltage compensator 140 of FIG. 5 may be understood as an embodiment in which weights are assigned to respective components of the interference error voltages to compensate reference voltages.

The weight voltage generator 142 receives the first to third interference error voltages Vce1 to Vce3. The first interference error voltage Vce1 is input to the first weight calculator WP1, fourth weight calculator WP4 and seventh weight calculator WP7. The second interference error voltage Vce2 is input to the second weight calculator WP2, fifth weight calculator WP5 and eighth weight calculator WP8. The third interference error voltage Vce3 is input to the third weight calculator WP3, sixth weight calculator WP6 and ninth weight calculator WP9. The first to third weight calculators WP1 to WP3 relate to compensation of the first reference voltage Vrf1. The fourth to sixth weight calculators WP4 to WP6 relate to compensation of the second reference voltage Vrf2. The seventh to ninth weight calculators WP7 to WP9 relate to compensation of the third reference voltage Vrf3.

First to ninth weight variables are respectively set to the first to ninth weight calculators WP1 to WP9. The first to ninth weight calculators WP1 to WP9 assign the set weight variables to the input interference error voltages. In other words, the first to ninth weight calculators WP1 to WP9 may multiply the input interference error voltages by the set weight variables. For example, the first weight calculator WP1 may multiply the first interference error voltage Vce1 by the first weight variable. The second weight calculator WP2 may multiply the second interference error voltage Vce2 by the second weight variable. When three output terminals are provided to the DC-DC converter 100, three interference error voltages are respectively reflected to the three output terminals and thus total 9 weight calculators may be provided. In other words, the number of weight calculators included in the weight voltage generator 142 may be square of the number of output terminals. A detailed description for the weight variables will be provided later.

The first adder 142 adds the multiplied outputs from the first to third weight calculators WP1 to WP3 to generate a first weight voltage Vw1. The second adder 144 adds the multiplied outputs from the fourth to sixth weight calculators WP4 to WP6 to generate a second weight voltage Vw2. The third adder 146 adds the multiplied outputs from the seventh to ninth weight calculators WP7 to WP9 to generate a third weight voltage Vw3.

The first to third weight voltages Vw1 to Vw3 depend on the magnitude of an overshoot or undershoot due to interference. In other words, as a change in output voltage due to the overshoot or undershoot is larger, the absolute values of the first to third weight voltages Vw1 to Vw3 are largely generated. In addition, the absolute vale of a weight voltage corresponding to an output terminal of which load is abruptly changed is largely generated than those of other weight voltages. For example, when a load connected to the first output terminal is abruptly changed and thus interference occurs, the absolute value of the first weight voltage Vw1 is larger than those of the second and third weight voltages Vw2 and Vw3.

The first buffer BF1 receives the first reference voltage Vrf1 and the first weight voltage Vw1. The first buffer BF1 compensates the first reference voltage Vrf11 on the basis of the first weight voltage Vw1. The second buffer BF2 receives the second reference voltage Vrf2 and the second weight voltage Vw2. The third buffer BF3 compensates the third reference voltage Vrf3 on the basis of the third weight voltage Vw3. Each of the first to third buffers BF1 to BF3 may increase or decrease the levels of the first to third reference voltages Vrf1 to Vrf3 in dependence on the level of a corresponding weight voltage from among the first to third weight voltages Vw1 to Vw3.

The first buffer BF1 generates a first compensation reference voltage Vcrf1. The first compensation reference voltage Vcrf1 may be generated in a direction to suppress a change in first output voltage Vo1. For example, when the first output voltage Vo1 is overshoot, the level of the first compensation reference voltage Vcrf1 may be reduced to suppress an overshoot of the first output voltage Vo1. A voltage reduction amount of the first compensation reference voltage Vcrf1 depends on the level of the first weight voltage Vw1. The second buffer BF2 generates a second compensation reference voltage Vcrf2. The second compensation reference voltage Vcrf2 may be generated in a direction to suppress a change in second output voltage Vo1. The third buffer BF3 generates a third compensation reference voltage Vcrf3. The third compensation reference voltage Vcrf3 may be generated in a direction to suppress a change in third output voltage Vo3. The generated first to third compensation reference voltages Vcrf1 to Vcrf3 are again provided to the error detector 120 of FIG. 2 so as to be compared with the first to third feedback voltages Vfb1 to Vfb3.

Figure 6:
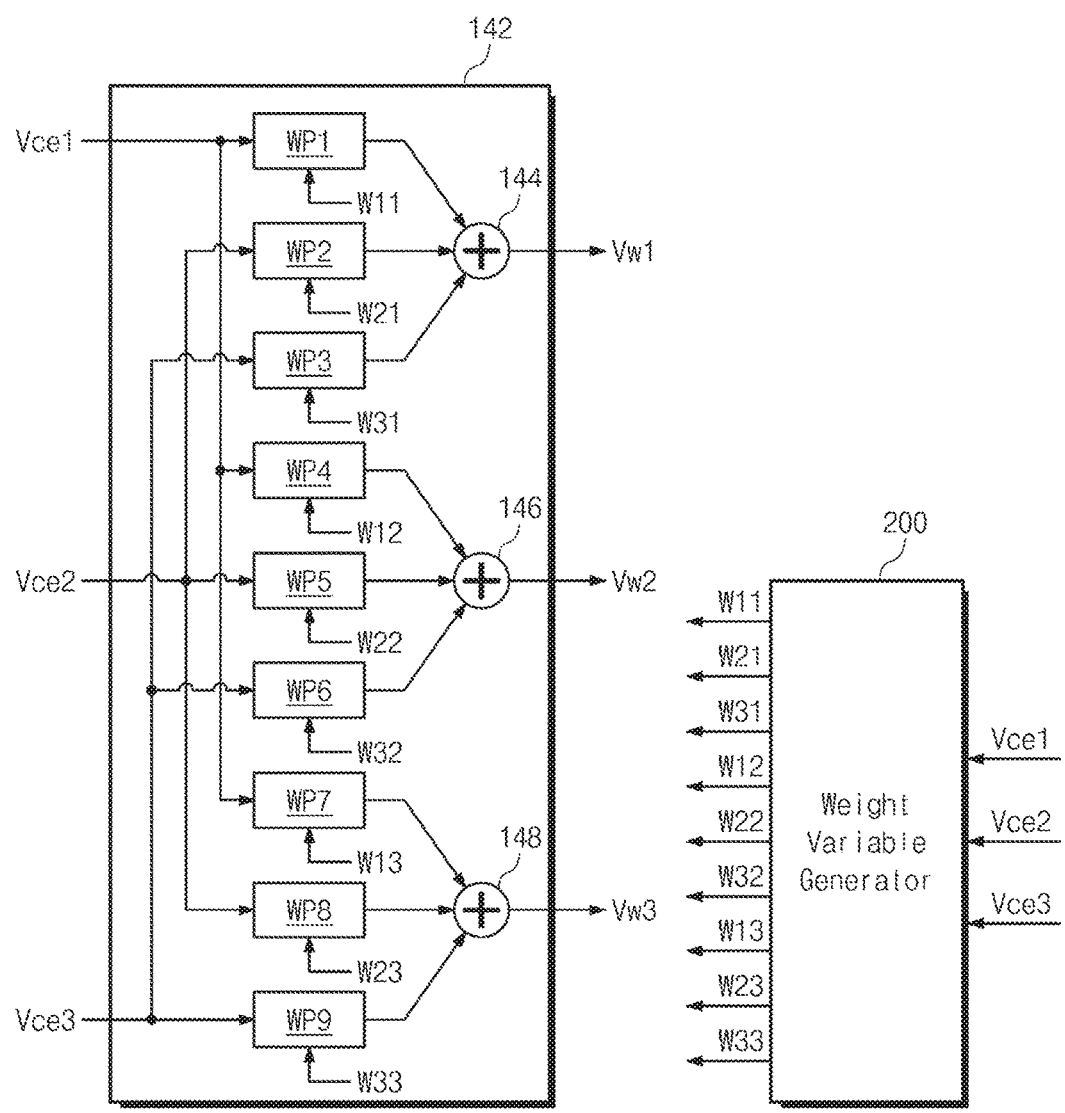
FIG. 6 is a drawing for explaining weight variables provided to the weight voltage generator of FIG. 5.

FIG. 6 is a drawing for explaining weight variables provided to the weight voltage generator of FIG. 5. In relation to FIG. 6, the weight voltage generator 142 includes first to ninth weight calculators WP1 to WP9, and first to third adders 144, 146, and 148. The configuration of the weight voltage generator 142 is the same as that of FIG. 5, and thus a detailed description thereabout will be omitted.

The first to ninth weight calculators WP1 to WP9 receive corresponding weight variables from among the first to ninth weight variables W11 to W31, W12 to W32, and W13 to W33. Such weight variables W11 to W31, W12 to W32, and W13 to W33 may be generated by a weight variable generator 200. The weight variable generator 200 may be included in the DC-DC converter driving device 110 of FIG. 1 or FIG. 2. However, the inventive concept is not limited thereto, and the weight variable generator 200 may be a separate external device. In addition, the first to ninth weight calculators WP1 to WP9 may autonomously generate the weight variables.

The weight variable generator 200 may determine values of the first to ninth weight variables W11 to W33 according to the levels of the first to third interference error voltages Vce1 to Vce3. The first to third interference error voltages Vce1 to Vce3 represent influences of interference by the first to third output terminals. For example, the first interference error voltage Vce1 may represent an output terminal to which a load inducing the interference is connected, a variation degree of the load, a degree of an overshoot or undershoot by the load. The second interference error voltage Vce2 and the third interference error voltage Vce3 may represent variation degrees of output voltages of other output terminals due to abrupt load variation, and relative influences by the interference. The weight variable generator 200 may receive the first to third interference error voltages Vce1 to Vce3 to determine values of the first to ninth weight variables W11 to W33 for minimizing changes in the first to third output voltages.

The weight variable generator 200 may determine the values of the first to ninth weight variables W11 to W33 in various ways. For example, the values of the first to ninth weight variables W11 to W33 may be stored in advance in the weight variable generator 200. According to the levels of the first to third interference error voltages Vce1 to Vce3, the first to ninth weight variables W11 to W33 for the corresponding interference error voltages may be output from among the stored weight variables.

Alternatively, the weight variable generator 200 may analyze the first to third interference error voltages Vce1 to Vce3 to calculate optimized first to ninth weight variables W11 to W33. To this end, the weight variable generator 200 may be implemented with, for example, a Micro Controller Unit (MCU) or Digital Signal Processor (DSP). The weight variable generator 200 may calculate change amounts of the first to third output voltages from the first to third interference error voltages Vce1 to Vce3, and calculate an influence by the interference for each output voltage. The weight variable generator 200 may predict the levels of the first to third weight voltages Vw1 to Vw3 for suppressing changes in the output voltages, and calculate the first to ninth weight variables W11 to W33 on the basis of the predicted first to third weight voltages Vw1 to Vw3.

Alternatively, the weight variable generator 200 may generate the first to ninth weight variables W11 to W33 using artificial intelligence. For example, the weight variable generator 200 continuously receives the first to third interference error voltages Vce1 to Vce3. The weight variable generator 200 may continuously learn the interference in the first to third output terminals due to the first to third interference error voltages Vce1 to Vce3. As a result of the continuous learning, the weight variable generator 200 may generate the first to ninth weight variables W11 to W33 optimized for the received first to third interference error voltages Vce1 to Vce3. To this end, the weight variable generator 200 may be implemented with a deep-learning neural network device.

Each of the generated first to ninth weight variables W11 to W33 may be provided to a corresponding weight calculator from among the first to ninth weight calculators WP1 to WP9. The first weight voltage Vw1 may be represented as (Vce1×W11)+(Vce2×W21)+(Vce3×W31). The second weight voltage Vw2 may be represented as (Vce1×W12)+(Vce2×W22)+(Vce3×W32). The third weight voltage Vw3 may be represented as (Vce1×W13)+(Vce2×W23)+(Vce3×W33). When the load connected to the first output terminal is abruptly changed and thus the interference occurs, the first weight variable W11 may have a larger value than the second weight variable W21 and the third weight variable W31. Namely, a relatively large weight is assigned to the first interference error voltage Vce1.

Figure 7A:
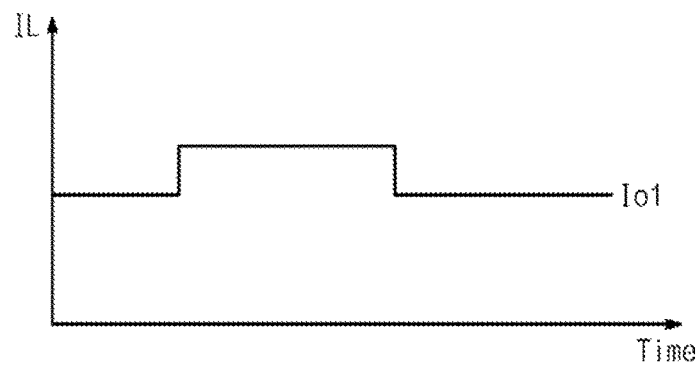
FIGS. 7A to 7C are graphs representing output current, compensated reference voltages and output voltages when a DC-DC converter is implemented according to an embodiment of the inventive concept.
Figure 7B:
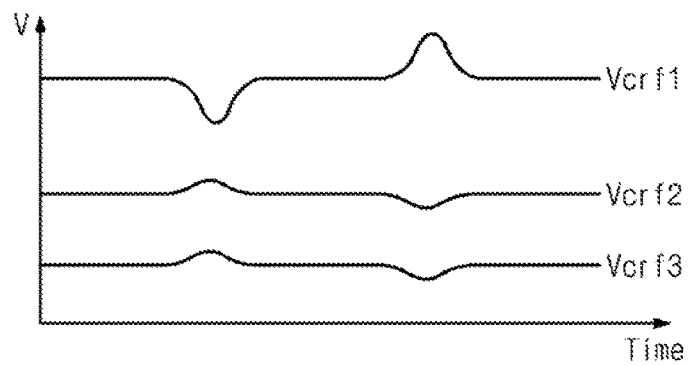
Figure 7C:
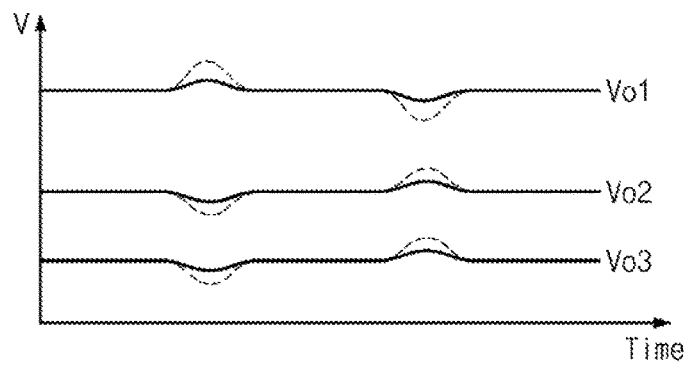

FIGS. 7A to 7C are graphs representing an output current, compensated reference voltages and output voltages at the time of implementing a DC-DC converter according to an embodiment of the inventive concept. FIGS. 7A to 7C are the graphs for explaining an operation of determining interference and compensating an output voltage, when the interference occurs by a variation in the load connected to the first output terminal. In the graph of FIG. 7A, the horizontal axis represents a time, and the vertical axis represents a first output current Io1 according to a time flow. In the graph of FIG. 7B, the horizontal axis denotes a time, and the vertical axis represents the first to third compensation reference voltages Vcrf1 to Vcrf3 according to a time flow. In the graph of FIG. 7C, the horizontal axis represents a time, and the vertical axis represents the first to third output voltages Vo1 to Vo3. In the graph of FIG. 7C, a dotted line represents the first to third output voltages Vo1 to Vo3 in a case where the reference voltage is not compensated. A solid line represents the first to third output voltages Vo1 to Vo3 in a case where the reference voltage is compensated. For convenience of description, the graphs will be described with reference numerals of FIGS. 1 and 2.

In relation to FIG. 7A, when the load connected to the first output terminal is abruptly changed from a light load to a heavy load, the first output current Io1 may abruptly increase. When the load connected to the first output terminal is abruptly changed from a heavy load to a light load, the first output current Io1 may be abruptly reduced.

In relation to FIG. 7B, when the load connected to the first output terminal is abruptly changed from a light load to a heavy load, the level of the first compensation reference voltage Vcrf1 may be instantaneously reduced. The level of the second compensation reference voltage Vcrf2 may instantaneously increase, and the level of the third weight voltage Vcrf3 may instantaneously increase. When the load connected to the first output terminal is abruptly changed from a heavy load to a light load, the level of the first compensation reference voltage Vcrf1 may instantaneously increase. The level of the second compensation reference voltage Vcrf2 may be instantaneously reduced, and the level of the third weight voltage Vcrf3 may be instantaneously reduced. The interference detector 130 may determine interference for the first to third output terminals, and the reference voltage compensator 140 compensates the first to third reference voltages Vrf1 to Vrf3 so as to suppress an overshoot or undershoot.

In relation to FIG. 7C, when the load connected to the first output terminal is abruptly changed from a light load to a heavy load, as shown with a dotted line, an overshoot may occur in the first output voltage Vo1. In addition, undershoots may occur in the second output voltage Vo2 and the third output voltage Vo3. An increase amount of the first output voltage Vo1 is larger than reduction amounts of the second output voltage Vo2 and the third output voltage Vo3. The DC-DC converter driving device 110 may respectively detect changes in the first to third output voltages Vo1 to Vo3 by means of the first to third feedback voltages Vfb1 to Vfb3. A compensation result of the first to third compensation reference voltages Vcrf1 to Vcrf3, as shown with a solid line, the overshoot of the first output voltage Vo1 is suppressed. In addition, the undershoots of the second output voltage Vo2 and the third output voltage Vo3 may be suppressed.

When the load connected to the first output terminal is abruptly changed from a heavy load to a light load, as shown with a dotted line, an undershoot may occur in the first output voltage Vo1. In addition, overshoots may occur in the second output voltage Vo2 and the third output voltage Vo3. A reduction amount of the first output voltage Vo1 is larger than increase amounts of the second output voltage Vo2 and the third output voltage Vo3. A compensation result of the first to third compensation reference voltages Vcrf1 to Vcrf3, as shown with a solid line, the undershoot of the first output voltage Vo1 is suppressed. In addition, the overshoots of the second output voltage Vo2 and the third output voltage Vo3 may be suppressed. Accordingly, the DC-DC converter 100 according to the inventive concept may maintain stable outputs, despite of an abrupt change in load.

FIG. 8 is a flowchart of a method for driving a DC-DC converter according to an embodiment of the inventive concept. The method for driving the DC-DC converter is performed in the DC-DC converter 100 of FIG. 1 or in the DC-DC converter driving device 110 of FIG. 2. For convenience of description, the method for driving the DC-DC converter will be described with reference numerals of FIGS. 1 and 2. In addition, for convenience of description, the DC-DC converter 100 will be described to include three output terminals, but the inventive concept is not limited thereto, and the various numbers of output terminals may be adopted.

In operation S110, the error detector 120 receives the first to third feedback voltages Vfb1 to Vfb3. Each of the first to third feedback voltages Vfb1 to Vfb3 may be generated by dividing the first to third output voltages Vo1 to Vo3. In other words, the first to third feedback voltages Vfb1 to Vfb3 may respectively represent changes in the first to third output voltages Vo1 to Vo3.

In operation S120, the error detector 120 generates the first to third error voltages Ve1 to Ve3. The error detector 120 may respectively compare the first to third feedback voltages Vfb1 to Vfb3 with the first to third compensation reference voltages Vcrf1 to Vcrf3. In a normal state without a variation of a load, the first to third compensation reference voltages Vcrf1 to Vcrf3 may have the same values as the first to third reference voltages Vrf1 to Vrf3. The error detector 120 may differentially amplify the first to third feedback voltages Vfb1 to Vfb3 and the first to third compensation reference voltages Vcrf1 to Vcrf3 to generate the first to third error voltages Ve1 to Ve3. In addition, the error detector 120 further generates priority information PI. The priority determiner 120 may set, as the highest priority, an error voltage having the largest absolute value from among the first to third error voltages Ve1 to ve3. In other words, the priority information PI may be information for indicating the highest priority from among the first to third error voltages Ve1 to Ve3.

In operation S130, the interference detector 130 generates the first to third error voltages Vce1 to Vce3. The interference detector 130 calculates the first to third error voltages Ve1 to Ve3 on the basis of the priority information PI. The interference detector 130 generates the first to third interference error voltages Vce1 to Vce3 on the basis of calculations by for the first to third error voltages Ve1 to Ve3. The interference detector 130 generates the first interference error voltage Vce1 having the same level as an error voltage set as the highest priority. When the first error voltage Ve1 is set as the highest priority, the interference detector 130 generates the first interference error voltage Vce1 having the same level as the first error voltage Ve1. In this case, the second interference error voltage Vce2 may have the level as large as a difference between the first error voltage Ve1 and the second error voltage Ve2. The third interference error voltage Vce3 may have the level as large as a difference between the first error voltage Ve1 and the third error voltage Ve3.

In operation S140, the reference voltage compensator 140 compensates the first to third reference voltages Vrf1 to Vrf3. The reference voltage compensator 140 assigns weights to the first to third interference error voltages Vce1 to Vce3 input from the interference detector 130 to generate the first to third weight voltages Vw1 to Vw3. The reference voltage compensator 140 may compensate the first to third reference voltages Vrf1 to Vrf3 with the first to third weight voltages Vw1 to Vw3 to obtain the first to third compensation reference voltages Vcrf1 to Vcrf3.

In operation S150, the error detector 120 may respectively compare again the first to third feedback voltages Vfb1 to Vfb3 with the first to third compensation reference voltages Vcrf1 to Vcrf3. The error detector 120 receives the first to third compensation reference voltages Vrf1 to Vrf3 from the reference voltage compensator 140. The error detector 120 may differentially amplify again the first to third feedback voltages Vfb1 to Vfb3 and the first to third compensation reference voltages Vcrf1 to Vcrf3 to generate new first to third error voltages Ve1 to Ve3. The interference detector 130 may generate the first to third interference error voltages Vcr1 to Vcr3 on the basis of the newly generated first to third error voltages Ve1 to Ve3. For example, when the first feedback voltage Vfb1 is overshoot, the first compensation reference voltage Vcrf1 may have a lower level than the first reference voltage Vrf1. In this case, the level of the regenerated first error voltage Ve1 may increase. When the first interference control signal Vcr1 is generated using the increased first error voltage Ve1, the overshoot of the first output voltage Vo1 may be suppressed more rapidly.

In operation S160, the switch controller 180 controls switches on the basis of the first to third interference control signals Vcr1 to Vcr3. The switch controller 180 may compare the synthesis control signal Vde, which is generated from the inductor current detector 150 or the sawtooth generator 160, with the first to third interference control signals Vcr1 to Vcr3. According to the comparison result, the switch controller 180 may control the switches to suppress overshoots or undershoots of the first to third output voltages Vo1 to Vo3.

Figure 9:
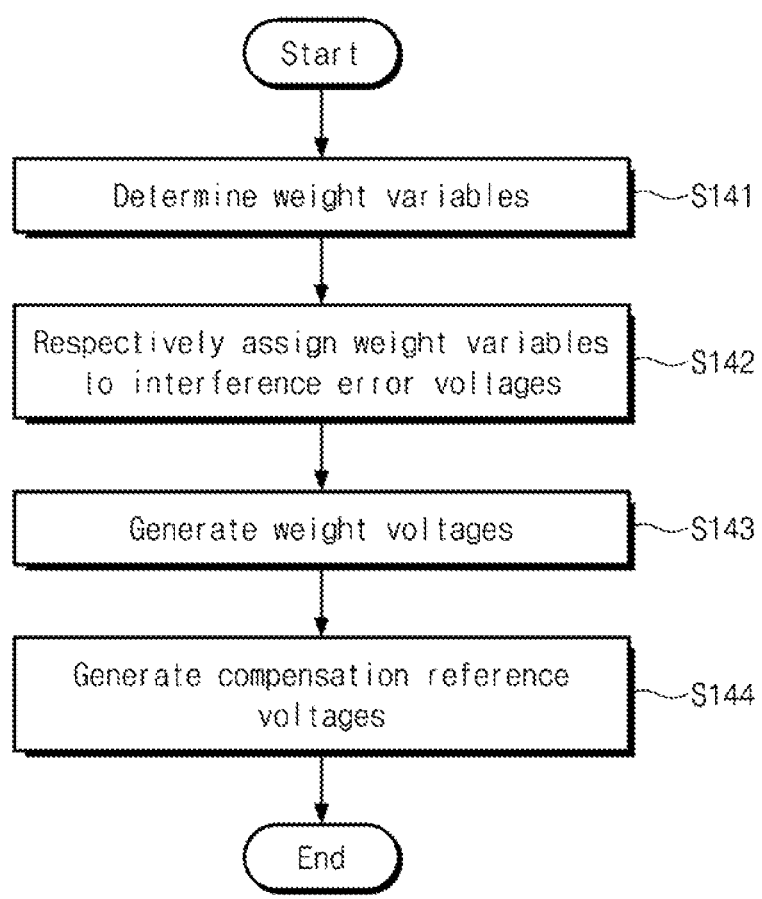
FIG. 9 is an exemplary flowchart of the process for compensating the reference voltages of FIG. 8.

FIG. 9 is an exemplary flowchart of a process for compensating the reference voltages of FIG. 8. An operation for compensating the reference voltages may be performed in the reference voltage compensator 140 of FIG. 2 or FIG. 5. For convenience of description, the operation for compensating the reference voltages will be described with reference numerals of FIG. 5.

In operation S141, the reference voltage compensator 140 determines the first to ninth weight variables W11 to W33. The weight variables are determined according to the levels of the first to third interference error voltages Vce1 to Vce3 input to the reference voltage compensator 140. For example, the reference voltage compensator 140 may read weight variables corresponding to the first to third interference error voltages Vce1 to Vce3 from among weight variables stored in advance. Alternatively, the weight variables may be results calculated by analyzing the first to third interference error voltages Vce1 to Vce3. Alternatively, the weight variables may be provided as a result of deep-learning.

In operation S142, each of the first to ninth weight calculators WP1 to WP9 assigns a weight variable to the input interference error voltage. Each of the first to ninth weight calculators WP1 to WP9 multiplies the input interference error voltage by the corresponding weight variable. The first weight calculator WP1 may multiply the first interference error voltage Vce1 by the first weight variable W11. The second weight calculator WP2 may multiply the second interference error voltage Vce2 by the second weight variable W21. The third weight calculator WP3 may multiply the third interference error voltage Vce3 by the third weight variable W31. The fourth weight calculator WP4 may multiply the first interference error voltage Vce1 by the fourth weight variable W12. The fifth weight calculator WP5 may multiply the second interference error voltage Vce2 by the fifth weight variable W22. The sixth weight calculator WP6 may multiply the third interference error voltage Vce3 by the sixth weight variable W32. The seventh weight calculator WP7 may multiply the first interference error voltage Vce1 by the seventh weight variable W13. The eight weight calculator WP8 may multiply the second interference error voltage Vce2 by the eighth weight variable W23. The ninth weight calculator WP9 may multiply the third interference error voltage Vce3 by the ninth weight variable W33.

In operation S143, the weight voltage generator 142 generates the first to third weight voltages Vw1 to Vw3. The first adder 144 adds the outputs from the first to third weight calculators WP1 to WP3 to generate the first weight voltage Vw1. The second adder 146 adds the outputs from the fourth to sixth weight calculators WP4 to WP6 to generate the second weight voltage Vw2. The third adder 148 adds the outputs from the seventh to ninth weight calculators WP7 to WP9 to generate the third weight voltage Vw3.

In operation S144, the first to third buffers BF1 to BF3 generate the first to third compensation reference voltages Vcrf1 to Vcrf3. The first buffer BF1 compensates the first reference voltage Vrf11 with the first compensation reference voltage Vcrf1 on the basis of the first weight voltage Vw1. The second buffer BF2 compensates the second reference voltage Vrf2 with the second compensation reference voltage Vcrf2 on the basis of the second weight voltage Vw2. The third buffer BF3 compensates the third reference voltage Vrf3 with the third compensation reference voltage Vcrf3 on the basis of the third weight voltage Vw3. The overshoot or undershoot according to the interference between the output terminals may be rapidly suppressed by compensating the reference voltage.

According to a DC-DC converter driving device and a method for driving a DC-DC converter using the same according to embodiments of the inventive concept may reduce occurrence of cross-regulation by determining priorities of respective outputs and assigning weights according to the priorities to compensate a reference voltage.

The foregoing description is about detailed examples for practicing the inventive concept. The present disclosure includes not only the above-described embodiments but also simply changed or easily modified embodiments. In addition, the present disclosure may also include technologies obtained by easily modifying and practicing the above-described embodiments.

What is claimed is:

1. A Direct Current-Direct Current (DC-DC) converter driving device, which drives a single-inductor multi-output (SIMO) DC-DC converter, comprising:
an error detector configured to compare a first feedback voltage corresponding to a first output terminal with a first compensation reference voltage to generate a first error voltage, and configured to compare a second feedback voltage corresponding to a second output terminal with a second compensation reference voltage to generate a second error voltage;
an interference detector configured to determine interference between the first output terminal and the second output terminal on a basis of the first and second error voltages to generate an interference error voltage on a basis of the determination; and a reference voltage compensator configured to assign a weight to the interference error voltage to generate the first and second compensation reference voltages.

2. The DC-DC converter driving device of claim 1, wherein the error detector compares an absolute value of the first error voltage with an absolute value of the second error voltage to generate priority information for indicating an error voltage having a largest absolute value.

3. The DC-DC converter driving device of claim 1, wherein the error detector comprises:
   a first error amplifier configured to amplify a difference between the first feedback voltage and the first compensation reference voltage to generate the first error voltage;
   a second error amplifier configured to amplify a difference between the second feedback voltage and the second compensation reference voltage to generate the second error voltage; and
   a priority determiner configured to set, as a priority, an error voltage having a larger value between the absolute values of the first and second error voltages.

4. The DC-DC converter driving device of claim 1, wherein the interference error voltage includes first and second interference error voltages, and the interference detector outputs the first interference error voltage to the reference voltage compensator, on a basis of priority information in which an error voltage having a largest absolute value between the first and second error voltages is set as a highest priority, the first interference error voltage having a same level as the error voltage having the absolute value of the highest priority to the reference voltage compensator, and outputs the second interference error voltage to the reference voltage compensator, the second interference error voltage being a difference between the error voltage having the absolute value of the highest priority and an error voltage having an absolute voltage of a next priority between the first and second error voltages.

5. The DC-DC converter driving device of claim 4, wherein the reference voltage generator comprises:
   a weight voltage generator configured to respectively assign weights to the first and second interference error voltages to generate first and second weight voltages;
   a first buffer configured to compensate a first reference voltage with the first compensation reference voltage on a basis of the first weight voltage; and
   a second buffer configured to compensate a second reference voltage with the second compensation reference voltage on a basis of the second weight voltage.

6. The DC-DC converter driving device of claim 5, wherein the weight voltage generator comprises:
   a first weight calculator configured to multiply the first interference error voltage by a first weight variable to output a first weighted interference error voltage;
   a second weight calculator configured to multiply the second interference error voltage by a second weight variable to output a second weighted interference error voltage;
   a first adder configured to add the first weighted interference error voltage to the second weighted interference error voltage to output the first weight voltage;
   a third weight calculator configured to multiply the first interference error voltage by a third weight variable to output a third weighted interference error voltage;
   a fourth weight calculator configured to multiply the second interference error voltage by a fourth weight variable to output a fourth weighted interference error voltage; and
   a second adder configured to add the third weighted interference error voltage to the fourth weighted interference error voltage to output the second weight voltage.

7. The DC-DC converter driving device of claim 6, wherein the first to fourth weight variables are generated by learning the interference determined from the interference detector.

8. The DC-DC converter driving device of claim 1, wherein the interference detector generates, in response to interference between the first output terminal and the second output terminal, a first interference control signal for adjusting a first output voltage to be output to the first output terminal and a second interference control signal for adjusting a second output voltage to be output to the second output terminal.

9. The DC-DC converter driving device of claim 8, further comprising a switch controller configured to adjust the first output voltage on a basis of the first interference control signal, and adjust the second output voltage on a basis of the second interference control signal.

10. The DC-DC converter driving device of claim 9, further comprising:
   an inductor current detector configured to detect an inductor current flowing through an inductor included in the SIMO DC-DC converter to generate a sensing signal; and
   a sawtooth wave generator configured to generate a sawtooth wave signal,
   wherein the switch controller compares a synthesis control signal generated based on the sensing signal or the sawtooth wave signal with the first or second interference control signal to control the first and second output voltages.

11. A method for driving a DC-DC converter comprising:
   receiving, by a DC-DC converter driving device, feedback voltages respectively corresponding to a plurality of output terminals;
   respectively comparing, by the DC-DC converter driving device, reference voltages respectively corresponding to the plurality of output terminals with feedback voltages to generate error voltages;
   generating, by the DC-DC converter driving device, interference error voltages on a basis of an error voltage having a largest absolute value from among the error voltages; and
   respectively assigning, by the DC-DC converter driving device, weights to the interference error voltages to compensate the reference voltages with compensation reference voltages.

12. The method of claim 11, wherein the generating of the error voltages comprises generating, by the DC-DC converter driving device, priority information in which the error voltage having the largest absolute value is indicated as a highest priority from among the error voltages.

13. The method of claim 11, wherein the generating of the interference error voltages comprises:
   generating, by the DC-DC converter driving device, an interference error voltage same as the error voltage having the largest absolute value from among the error voltages; and
   respectively calculating, by the DC-DC converter driving device, difference values between the error voltage having the largest absolute value and remaining error voltages to generate remaining interference error voltages.

14. The method of claim 11, wherein the compensating comprises:
- respectively generating, by the DC-DC converter driving device, weight variables on a basis of levels of the interference error voltages;
- respectively weighting, by the DC-DC converter driving device, the interference error voltages with corresponding weight variables from among the weight variables to generate weight voltages; and
- comparing, by the DC-DC converter driving device, the weight voltages with the reference voltages to generate the compensation reference voltages.

15. The method of claim 11, further comprising:
- respectively comparing, by the DC-DC converter driving device, the compensation reference voltages respectively corresponding to the plurality of output terminals with the feedback voltages to determine interference among the plurality of output terminals; and
- controlling, by the DC-DC converter driving device, output switches respectively corresponding to the plurality of output terminals on a basis of the determination.

* * * * *